H. KRIETE.
Folding-Bedstead.
No. 165,492. Patented July 13, 1875.
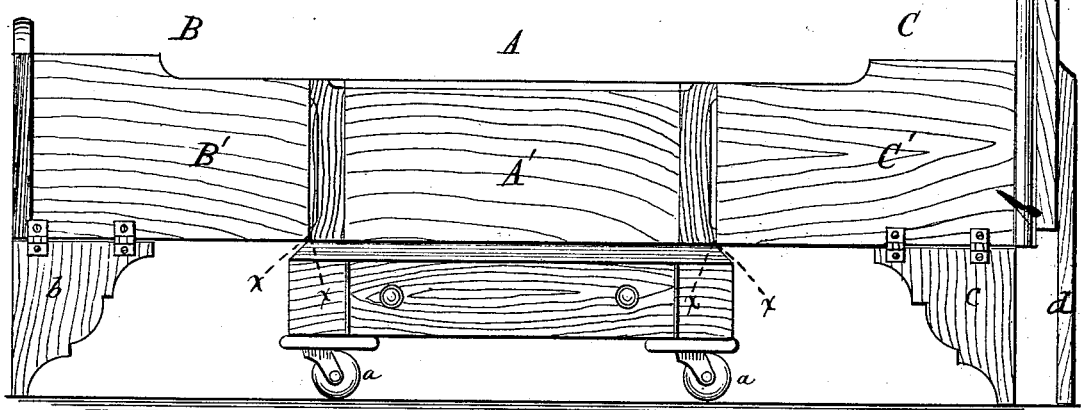
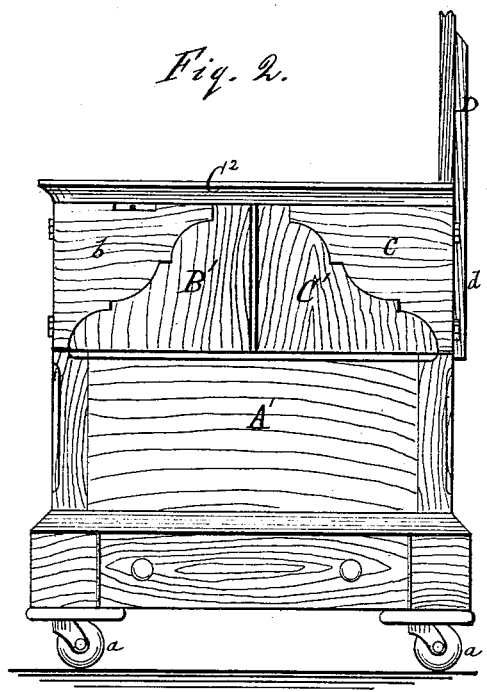
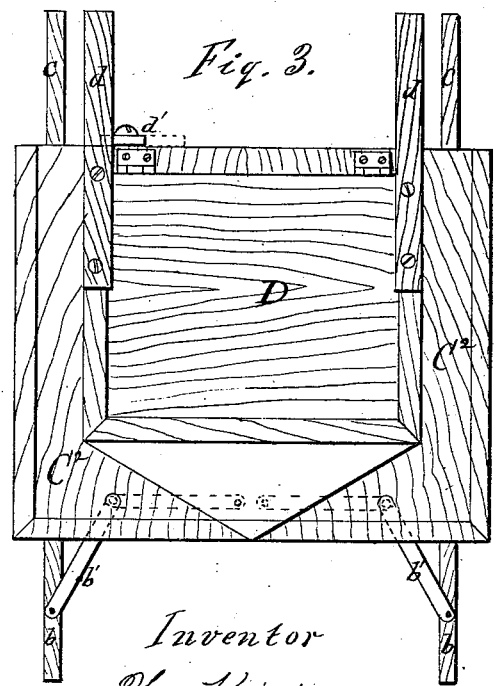
Attest
A. V. Stewart
L. Prehn.
Inventor
H. Kriete
T. Van Kannel
atty.

UNITED STATES PATENT OFFICE.

HEINRICH KRIETE, OF NEWPORT, KENTUCKY.

IMPROVEMENT IN FOLDING BEDSTEADS.

Specification forming part of Letters Patent No. 165,492, dated July 13, 1875; application filed May 6, 1875.

*To all whom it may concern:*

Be it known that I, HEINRICH KRIETE, of Newport, Campbell county, and State of Kentucky, have invented a new Improved Folding Bedstead; and I do hereby declare that the following is a full, clear, and exact description of the same, reference being had to the annexed drawing making a part of this specification.

Figure 1 is a side elevation, showing the bedstead extended. Fig. 2 is a side elevation when the same is folded; and Fig. 3 is a plan view with the mirror and folding legs in position to unfold the head and foot members.

The nature of my invention relates to that class of folding bedsteads which when extended form a complete double or single bed, and when folded constitute a presentable piece of furniture, and take up but little room.

My invention consists in providing a folding bedstead with a mirror hinged to one part thereof, so as to be folded up out of the way when the bedstead is opened, or adjusted for use when the latter is arranged as a dressing-case.

A is the fixed member, to which is hinged the member B, forming the foot of the bed, and the member C forming its head. To member B the legs $b\ b$ are hinged, which are held extended by two braces, $b'\ b'$, folded in, as seen by the dotted lines in Fig. 3 when not in use. $C^2$ is a head-board, to which is hinged a mirror, D. This is supplied with two legs, $d\ d$, which rest on the floor. When part D is not in use, as seen in Fig. 1, and when the structure is folded, as in Fig. 2, then the mirror D stands erect, and legs $d\ d$ form a stop and support for it. This is also provided with a simple latch of any suitable construction for holding the mirror in either of its two positions.

The operation of my invention becomes obvious from the above description. When the structure is found in the condition as seen in Fig. 2 it forms a presentable piece of furniture, having the mirror D at the rear, the whole appearing, and may be used, as a dressing-case. When it is desired to turn it into a bedstead the latch $d'$ is turned, whereby the mirror can be folded down on the head-board. Next, the legs $c\ c$ are unfolded, and then legs $b\ b$, the latter being braced by $b'\ b'$, which engage by a small pin in legs $b\ b$ entering corresponding holes in the braces. The head-board $C^2$ may then be extended, the legs $c\ c$ and $d\ d$ forming its support.

Having thus described my invention, what I claim as new, and desire to secure by Letters Patent, is—

The hinged mirror D provided with legs $d\ d$, forming stops for said mirror, in combination with the head section of a folding bedstead, substantially as described.

HEINRICH KRIETE.

Attest:
L. PREHN,
A. V. STEWART.